March 17, 1964  L. H. HAWTHORNE  3,125,669
WELDING TUBES TO TUBE SHEETS AND THE LIKE
Filed Oct. 30, 1956  5 Sheets-Sheet 1

Inventor:
Lowell H. Hawthorne
by Emery Booth Townsend
Miller & Weidner Attys March 17, 1964  L. H. HAWTHORNE  3,125,669
WELDING TUBES TO TUBE SHEETS AND THE LIKE
Filed Oct. 30, 1956  5 Sheets-Sheet 2

Inventor:
Lowell H. Hawthorne,
by Emery Booth Townsend
Miller & Weidner Attys March 17, 1964 L. H. HAWTHORNE 3,125,669
WELDING TUBES TO TUBE SHEETS AND THE LIKE
Filed Oct. 30, 1956 5 Sheets-Sheet 3

Inventor:
Lowell H. Hawthorne,
by Emery Booth Townsend
Miller & Weidner Attys

United States Patent Office 3,125,669
Patented Mar. 17, 1964

3,125,669
WELDING TUBES TO TUBE SHEETS
AND THE LIKE
Lowell H. Hawthorne, Verona, N.Y., assignor to Revere
Copper and Brass Incorporated, Rome, N.Y., a corporation of Maryland
Filed Oct. 30, 1956, Ser. No. 619,308
25 Claims. (Cl. 219—125)

My invention relates to welding, and particularly, but not exclusively, to welding tubes to tube sheets and like structures having openings to which the end portions of the tubes are presented to form joints which are welded by fusing the metal thereat by an electric arc.

The invention has among its objects a welding gun having an electrode and provision for rotating the electrode circumferentially of the joint while the arc is being struck for effecting the welding. A further object of the invention is the provision in such a gun of means which coacts with the tube being welded for registering with the axial line of the tube the axis about which the electrode is rotated. A still further object of the invention is the provision of automatic means for controlling the entire welding operation.

The above and yet further objects of the invention will be best understood from the following description when read in the light of the accompanying drawings of a specific embodiment of the invention selected for illustrative purposes, the scope of the invention being more particulary pointed out in the appended claims.

In the drawings:

FIG. 7 is a section on the line 7—7 of FIG. 2, on an enlarged scale;

Referring to the drawings, the gun illustrated comprises a sleeve-like casing 1 having welded thereto at its under side a boss 3 to which is secured by bolts 5 a hollow handle 7.

The handle may be of the common construction employed in connection with portable electric tools such as electric drills. It comprises a trigger 9 for operating a switch contained in a casing 11, which switch places, when the trigger is depressed by a finger of the operator's hand grasping the handle, the leads 13 and 15 in electrical communication, and opens automatically to interrupt such communication when the depressed trigger is released. Herein these leads extend to the control apparatus hereinafter described so that such apparatus may be placed in operation by such depressing of the trigger.

Within the casing 1 is positioned a cylindrical sleeve 17, and fitted within the sleeve is a cylindrical block 19 of insulating material. This block is shown at its rearward end as provided with an outwardly extending annular flange 21 secured to the sleeve in non-rotatable relation thereto by screws 23. As shown, the flange adjacent its outer periphery rotatably bears against the rearward end of the casing so as to close that end.

For rotatably mounting the sleeve 17 within the casing 1 coaxially therewith there are provided spaced ball bearings having the inner races 25 and the outer races 27. The inner races have a pressed fit on the exterior of the sleeve, while the outer races slidingly fit the interior surface of the sleeve ond are fixedly removably secured to the sleeve by set screws 29. The balls 31 of the ball bearings which fit the grooves 33 in the races act to prevent axial movement of the sleeve relative to the casing.

As shown, carried by the rotatable sleeve 17 in axial alignment therewith is a mandrel 35 for insertion in the bore of the tube to be welded to the tube sheet so as to place the axis of rotation of the sleeve and insulating block 19 in registry with the longitudinally extending axis of the tube. As shown, the mandrel adjacent each of its opposite ends has rotatably mounted thereon a collar 37 which engages the interior wall surface of the tube so that the mandrel may readily rotate therein. As shown, these collars are supported on the mandrel by anti-friction bearings comprising the rollers 39. The mandrel is shown as secured to the sleeve by a bracket 41 positioned at one side of and projecting from the forward end of the sleeve, this bracket being integral with the sleeve and the rearward end of the body portion of the mandrel. The electrode 43, from which the arc is struck against the joint to be welded, is carried by the insulating block 19 diametrically opposite the bracket 41 so that the bracket will always be out of the path of the arc as the electrode and bracket rotate with the sleeve.

Figure 2:
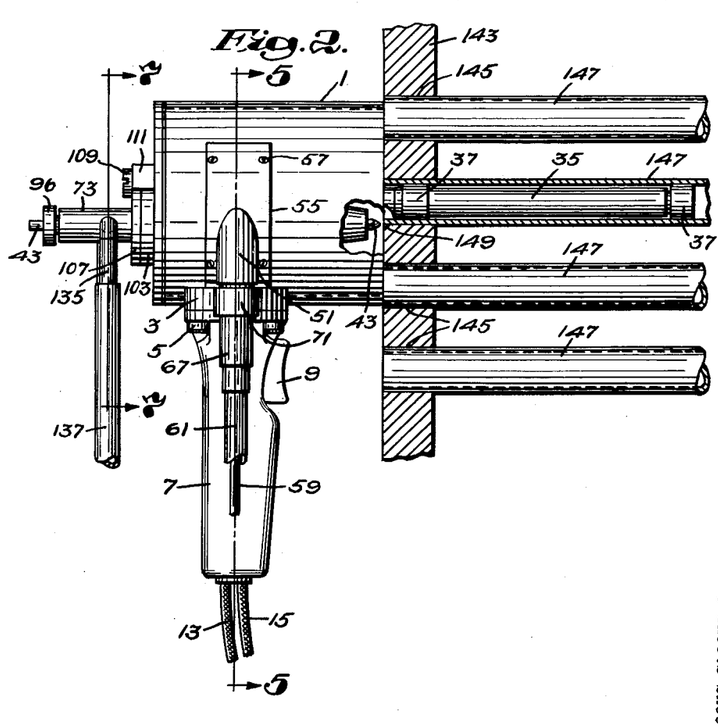
FIG. 2 is an elevation of the gun according to FIG. 1, on an enlarged scale, with parts broken away, and showing the gun applied to the tube sheet for welding one of the tubes to it.

For rotating the sleeve 17 and electrode 43 the sleeve is shown as carrying adjacent its central portion a wormwheel 45 in the form of a ring having a pressed fit on the exterior of the sleeve. Meshing with the wormwheel is a worm 47 fixedly carried by a short shaft 49, which shaft is rotatably carried at opposite sides of the worm by a block 51. The block 51, as shown, extends into an opening 53 in the casing 1, and is provided with a peripheral flange 55 resting against the exterior surface of the casing and removably secured to the casing by screws 57 (FIG. 2). As shown, the shaft 49 fixedly carrying the worm 47 is driven by a fiexible drive, of common construction, comprising the flexible driving cable 59 housed by the flexible tube 61. The flexible cable adjacent the gun fixedly carries a head 63 for rotation therewith, which head is provided in the usual manner with a bore of square cross-section for non-rotatably and removably receiving the lower end portion 65, of complementary cross-section, of the shaft, while the sleeve 67 fixedly carried at the adjacent end of the flexible tube 61 is detachably secured to the exteriorly screw-threaded nipple portion 69 of the block 51 by an interiorly screw-threaded coupling sleeve 71 for holding the parts in assembled relation. The flexible cable is driven by an electric motor in a way hereinafter more fully described.

Figures 6, 8, 9:
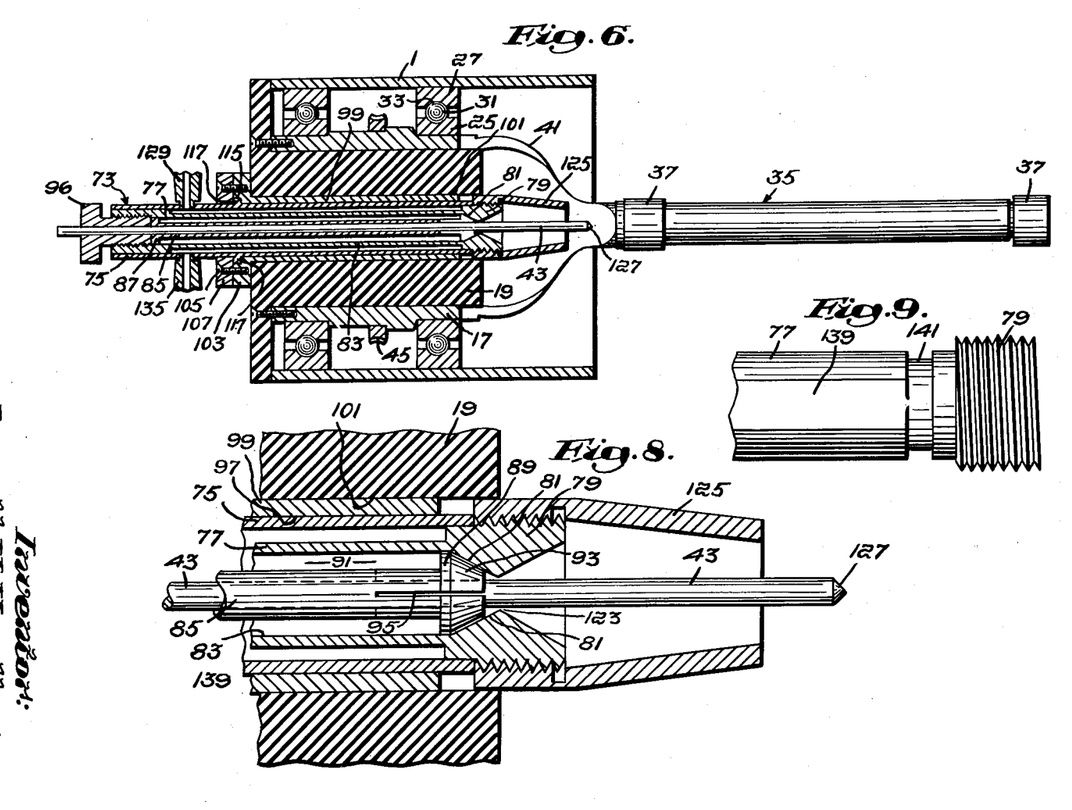
FIG. 6 is a section on the line 6—6 of FIG. 4.
FIG. 8 is a fragmentary view, corresponding to FIG. 6, on an enlarged scale, with parts in elevation.
FIG. 9 shows a detail.

As shown, the electrode 43 is in the form of an elongated rod, of relatively small diameter, of refractory conductive metal preferably tungsten. The electrode is shown as carried by an electrode holder 73 comprising an exterior elongated sleeve 75 through which the electrode operatively extends axially thereof. Fitted within this sleeve is a second elongated sleeve 77 which at its forward end, as shown in FIGS. 6 and 8, is formed to provide a head 79 having an interior frusto-conical surface 81 forming a prolongation of the bore 83 of said sleeve. The electrode is received in and slidably fits the bore of a sleeve 85 within and positioned coaxially of the sleeve 77, the sleeve 85 at its rearward end having a head 87 and at its forward end a head 89, which heads slidably fit the bore 83 of the sleeve 77. The portion of the sleeve 85 intermediate these heads is of less diameter than the bore 83 (FIG. 8) so as to leave an annular space 91 within the sleeve 77 between these heads surrounding the sleeve 85. As shown, the head 89 on the sleeve 85 is formed with an exterior frusto-conical surface 93 bearing against the interior frusto-conical surface 81 of the head 79 on the sleeve 77. As shown, the head 89 and the adjacent portion of the sleeve 85 are formed with longitudinally extending slits 95 opening on the forward end of such head so that by pressing the sleeve forward the portions thereof between the slits will be flexed inward by coaction of the two frusto-conical surfaces to grip the electrode, thus permitting the electrode to be adjusted longitudinally relative to the electrode holder. For releasably pressing the sleeve 85 forward the rearward end portion of the sleeve 77 is interiorly screw-threaded and receives the exteriorly screw-threaded shank of a tubular screw 96, through the bore of which screw the electrode slidably extends. The forward end of the shank of the screw is adapted to bear against the adjacent end of the sleeve 85 and releasably press such sleeve forward.

Figures 1, 5:
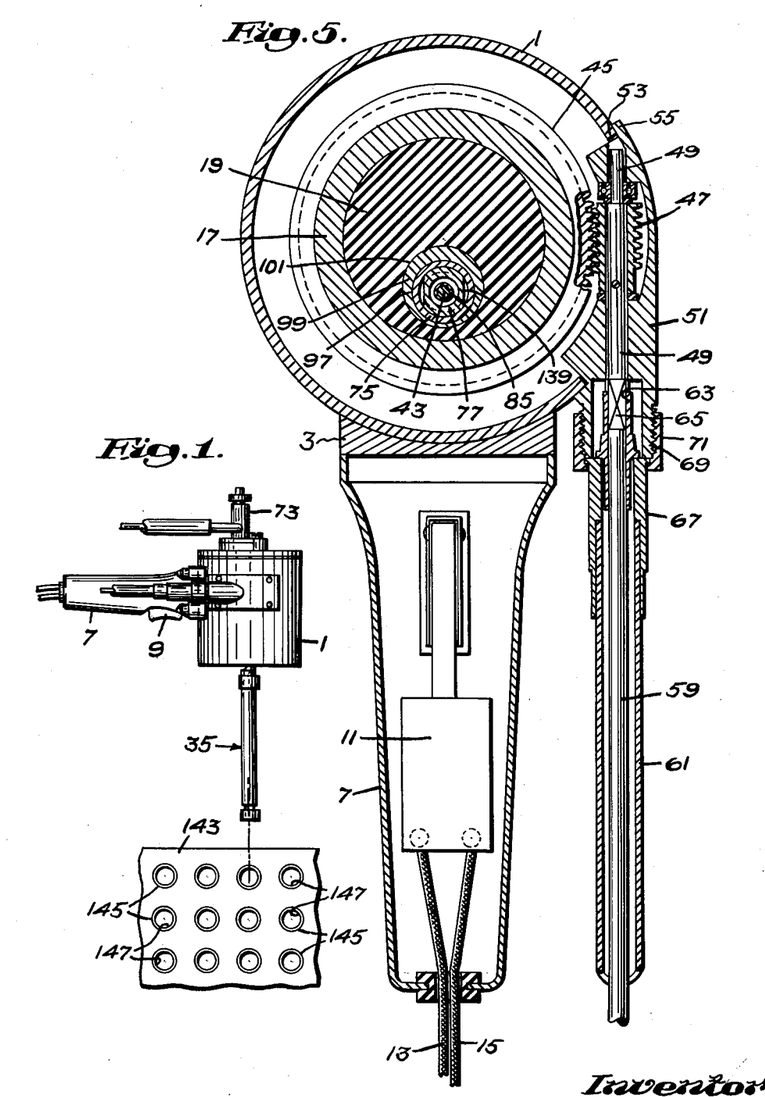
FIG. 1 is a side elevation of a gun according to the invention schematically associated with a tube sheet having openings in which the tubes are inserted preparatory to the gun being applied thereto for welding them separately to the tube sheet.
FIG. 5 is a section on the line 5—5 of FIG. 2, on an enlarged scale.
Figure 3:
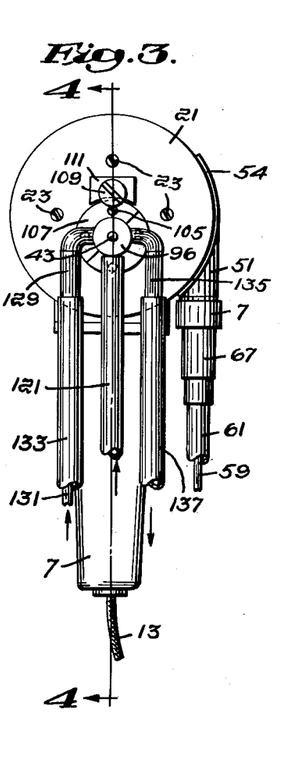
FIG. 3 is an end view of the gun according to FIG. 2 a viewed from the left.
Figures 3, 4:
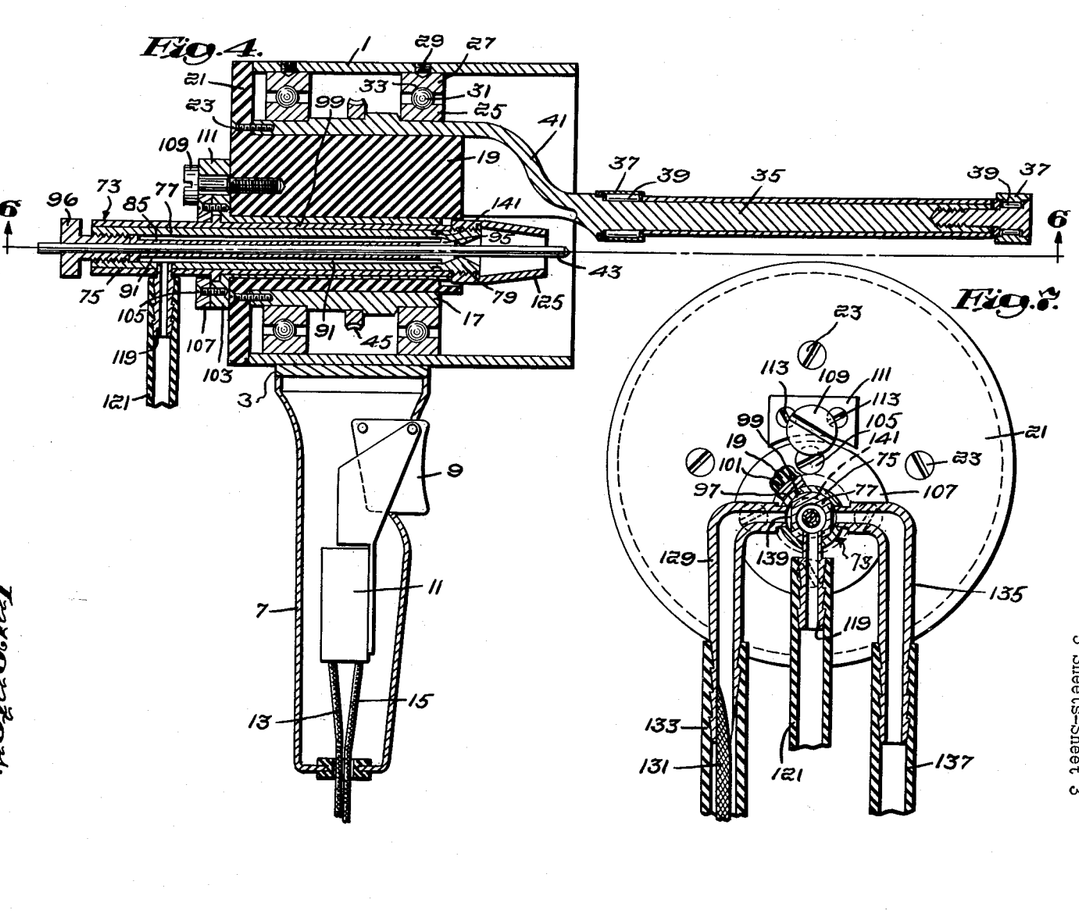
FIG. 4 is a section on the line 4—4 of FIG. 3, on an enlarged scale.

As shown, the outer sleeve 75 of the electrode holder 73 is received in and rotatably fits the bore 97 of a sleeve 99 (FIGS. 5, 7 and 8). The sleeve 99 is mounted for rotative adjustment in a longitudinally extending bore 101 in the insulating block 19, and the bore 97 of the sleeve is eccentric to the bore 101, as best indicated in FIGS. 5 and 7. By this construction by manually rotating the sleeve 99 relative to the insulating block 19 the position of the electrode holder and the electrode radially of the axis of the mandrel 35 may be varied. For holding the sleeve 99 in its angularly adjusted positions it is provided at its rearward end with an outwardly extending annular flange 103 which bears against the adjacent side of the insulating block 19. Bearing against the outer side of this flange, and secured thereto by screws 105, is a washer 107. Extending from the rearward side of the block 19 is a clamping screw 109 the flat head of which is adapted to bear against the outer side of the washer, and the shank of which is tapped into the block so that tightening of the screw serves to clamp the flange 103 against the block. For preventing undue strain on the shank of the screw 109 when the screw is tightened there is provided at the side of the screw opposite the washer 107 a block 111 secured to the block 19 by screws 113 (FIGS. 4 and 7), against the outer side of which block 111 the head of the screw 109 bears when it is tightened to bear against the outer side of the washer.

As further shown, the outer side of the flange 103 on the angularly adjustable sleeve 99 is formed with an annular recess 115 (FIG. 6) which receives an outwardly extending annular flange 117 integral with the sleeve 75. The washer 107 holds the flange 103 within the recess 115 and therefore holds the electrode holder within the sleeve 99. The sleeve 77 positioned within the outer sleeve 75 of the electrode holder is fixedly and releasably secured thereto by a nipple 119 (FIG. 4) which extends through a perforation in the outer sleeve and is tapped into the sleeve 77.

Connected to the nipple 119 is a flexible hose 121 for conducting an inert gas, such as argon, to the gun for shielding the arc. The nipple opens into the space 91 within the sleeve 77 surrounding the body portion of the sleeve 85. The gas flows through this space to its forward end and escapes therefrom through the slits 95 to the forward side of the head 89 on the sleeve 77 and hence through the clearance 123 (FIG. 8) between the bore of said head and the electrode into a nipple 125 screw-threaded on the exterior of said head, which nipple conducts the gas toward the tip portion 127 of the electrode for shielding the arc and the weld as the latter is being formed.

For supplying the welding current to the electrode there is screw-threaded into the outer sleeve 75 of the electrode holder 73 a nipple 129 to which is brazed, as shown in FIG. 7, the end portion of a flexible conductor 131. For cooling the conductor and electrode, to enable them to be of relatively small cross-section and yet carry a relatively high current, the conductor extends through a flexible hose 133 of insulating material as, for example, rubber, which hose leads to the nipple from a source of water supply under pressure. Diametrically opposite the nipple 129 is shown a second nipple 135 tapped into the sleeve 75, to which second nipple is attached a flexible hose 137 for conducting cooling water away from the gun. For conducting the water through the electrode holder diametrically opposite sides of the sleeve 77 are flattened, as shown at 139 (FIG. 7), to form in conjunction with the sleeve 75 a pair of passages exteriorly of the sleeve 77 extending lengthwise thereof from adjacent the nipples 129 and 135 to adjacent the head 79 on the sleeve 77. These two passages adjacent their rearward ends communicate with the nipples 129 and 135, respectively. The passages are placed at their forward ends in fluid communication by the arcuate grooves 141 (FIGS. 4, 7 and 9) formed about the sleeve 77 adjacent the head 79.

It will be observed that when the block 19 is rotated the water and gas tubes connected to the gun are prevented from twisting because, being directly connected to the electrode holder, and that holder being rotatable relative to the block 19 which carries it, the electrode does not rotate on its axis relative to the casing of the gun but only relative to the block, so that as the block rotates the holder may partake of a planetary movement during which any given one of its longitudinal sides always faces in the same direction.

The tube sheet 143 is shown in FIGS. 1 and 2 as formed with openings 145, of circular cross-section, in which are inserted the round tubes 147. The welding gun constructed as illustrated is employed for welding the joint 159 between the tube and tube sheet at the side of the latter adjacent the end of the tube. To accomplish this the mandrel 35 is inserted in the bore of the tube and the gun pushed forward until the end of its casing 1 adjacent the mandrel bears against the side of the tube sheet, which, if the electrode is adjusted properly with respect to the electrode holder and the axis of rotation of the block 19, will position the electrode in welding relation to the joint to be welded, and at the same time will position the common axis of rotation of the block 19 and electrode in registry with the longitudinal axial line of the tube. The operator, by holding the handle 7 and depressing the trigger 9, will cause, in a manner hereinafter described, welding current to be supplied to the electrode and cause the block 19 to rotate and thus move the tip of the electrode circumferentially about the joint while presented thereto in welding relation the portion of the casing or sleeve 1 between the tube sheet and adjacent bearing 25, 27 serving as a shield positioned between the arc and space surrounding the gun. By means hereinafter described the operation may be made entirely automatic. Preferably the sequence of events occurring during such operation is as follows:

(1) Upon the gun being presented by the operator to the joint to be welded the trigger 9 may be depressed by the operator to close the switch associated with such trigger for establishing a circuit through the control apparatus by way of the closed switch and the two leads 13 and 15. Preferably the control apparatus is such that the trigger need be depressed only momentarily and, when so depressed, establish a holding circuit about the switch, which circuit is automatically interrupted when the welding cycle is completed.

(2) The momentary closure of the switch and resulting establishment of the holding circuit according to item (1) establishes a flow of the shielding gas through the hose 121 to the gun, and establishes a flow of cooling water to the hose 133 for cooling the conductor 131 and the electrode. Preferably these flows of gas and cooling water are effected by the control apparatus energizing a pair of solenoid valves for opening them, one for establishing the flow of gas and the other for establishing the flow of cooling water. Preferably the two valves are opened simultaneously.

(3) Upon establishing the supply of inert gas to the gun, then after elapse of a short period, say a fraction of a second, sufficient to cause the gas to purge the region in which the arc is to be struck and the weld is to be formed, the control apparatus automatically energizes a motor which drives the flexible cable for rotating the electrode and establishes the arc. Preferably the motor is enrgized and the arc established simultaneously. Preferably also the energization of the motor and establishment of the arc are effected by a timer placed in operation upon closure of the switch operated by the trigger and establishment of the above mentioned holding circuit.

(4) When rotation of the electrode and the arc completes the weld the control apparatus automatically causes a "decay" in the welding current to reduce it sufficiently to prevent, upon interruption of the current, the formation in the weld of a crater of sufficient size to make the welded joint subject to cracking. When the welding current has been sufficiently reduced it is automatically interrupted and the motor which rotates the electrode automatically deenergized. Preferably the welding current is interrupted and the motor deenergized simultaneously. Preferably also the decay in the welding current, the interruption of that current, and deenergization of the motor are caused by a second timer set in operation by the timer (item 3) which establishes the welding current and energizes the motor. The decay in the welding current is caused in this way to commence upon the electrode rotating through a predetermined angular distance in excess of one revolution so as to insure that it does not commence until the weld is completed, it being understood that formation of the weld does not commence at the very instant the arc is initially struck. This angular distance the electrode rotates after making one revolution need in any ordinary case not exceed about 20°, and in any ordinary case sufficient decay in the welding current to prevent forming the crater when that current is interrupted may be caused before the electrode has completed its second revolution. However in unusual cases such angular distance may be sufficient to cause the electrode to rotate through several revolutions before the decay in the welding current is caused to commence.

The adjustment of the control apparatus necessary to secure a proper minimum welding time, that is to say the time which elapses between the initiation of the arc and the commencement of decay of the welding current, will vary with the outside diameter of the tube, the metal of the tube and tube sheet, and the intensity of the welding current available. When, for example, the outside diameter of the tube is ¾ inch and the metal of the tube and tube sheet is admiralty metal, it has been found that satisfactory results will ordinarily be secured with a normal welding current when such welding time is about 1½ seconds, during which time the electrode will be rotated through one revolution plus 20°. Under the same conditions, when the tube and tube sheet are of stainless steel, a longer welding time will ordinarily be required, say about 15 seconds, during which time the electrode again will be rotated through one revolution plus about 20°.

Figure 10:
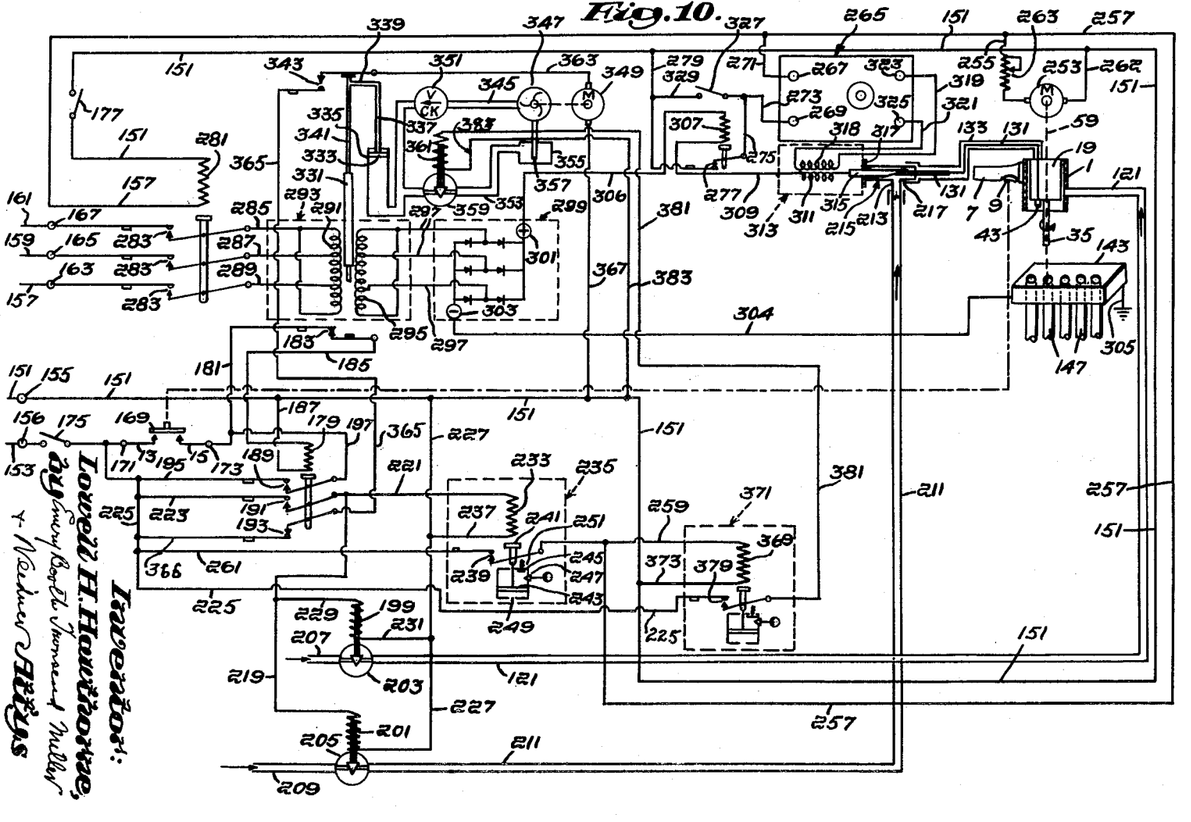
FIG. 10 is a schematic wiring diagram.

Referring to the wiring diagram according to FIG. 10, the sides of a single phase line indicated by the leads 151 and 153 are connected to the terminals 155 and 156 of the control apparatus, while the sides of a three phase line indicated by the leads 157, 159 and 161 are connected to the terminals 163, 165 and 167, respectively. The leads 13 and 15 from the switch 169 operated by the trigger 9 of the gun are shown as connected to terminals 171 and 173, respectively.

Upon closure of the two safety switches 175 and 177 of the control apparatus the trigger may be momentarily depressed to close the switch 169. This will establish a circuit between the two leads 151 and 153 of the single phase line through the coil 179 of a relay switch by way of the lead 181, connected to the terminal 173, normally closed switch contacts 183, lead 185 connected to one terminal of the coil 179, and lead 187 connecting the other terminal of the coil to the lead 151. The relay switch having the coil 179 has the normally open pairs of switch contacts 189 and 191 which are closed by energization of the coil, and has the normally closed pair of switch contacts 193 which are opened by energization of the coil.

Closure of the contacts 189 establishes a holding circuit about the switch 169 and coil 179 by way of the lead 195 connecting the lead 153 to one contact of the pair of contacts 189 and the lead 197 connecting the other contact of the pair to the lead 181.

Closure of the pair of switch contacts 191 energizes the solenoid coils 199 and 201 of the solenoid valves 203 and 205, respectively, causing said valves to open. Opening of the solenoid valve 203 establishes communication between the pipe 207, leading from a source of shielding gas under pressure, and the flexible hose 121 so as to supply shielding gas to the gun. Opening of the solenoid valve 205 establishes communication between the pipe 209, leading from a source of water under pressure, and a pipe 211 connected to the inlet portion 213 of a T-fitting 215. The outlet portion 217 of the T-fitting is connected to the flexible hose 133 for supplying the cooling water to the gun.

Energization of the solenoid coil 201 is effected by the switch contacts 191, when closed, connecting one terminal of that coil to the side 153 of the single phase power line by way of the lead 219, lead 221, these closed contacts, lead 223, lead 225, and lead 195, the other terminal of the coil being permanently connected by the lead 227 to the other side 151 of such power line. Energization of the solenoid coil 199 is effected, when the switch contacts 191 are closed, by reason of the leads 229 and 231 connecting that coil in parallel with the coil 201.

Closure of the switch contacts 191 also energizes the coil 233 of a timer 235 by reason of one terminal of this coil being connected to the lead 221 and its other terminal being connected by the lead 237 to the lead 227 for placing the coil in parallel with the solenoid coils 199 and 201 of the two solenoid valves so that the timer will be energized simultaneously with opening of said valves. As schematically illustrated, the timer includes a switch having a pair of cooperating contacts 239, a vertically movable armature 241, and a dashpot having a vertically movable piston 243 connected to the armature. For adjusting the speed of movement of the piston 243 the dashpot cylinder 245 is, as indicated, provided above the piston with an adjustable needle valve 247 for controlling escape of air from the cylinder above the piston. When the coil 233 of the timer is energized it acts to draw the armature upward, which upward movement is resisted by the air trapped in the cylinder above the piston. The rate at which the air escapes from the cylinder may be regulated by adjustment of the needle valve to determine the time interval between energization of the coil 233 of the timer and closure of the contacts 239 as above described. When the coil is deenergized the contacts will open practically immediately by reason of the bottom of the cylinder being open to the atmosphere, as indicated at 249, and the presence of a check valve 251 at the top of the cylinder which admits atmospheric air thereto when the piston tends to descend by gravity. The timer, which is of well known construction, also may comprise adjustable lost motion means (not indicated) effective, when the armature moves upward a predetermined distance, while such movement is being opposed by the dashpot piston, to take up the lost motion to which said means is adjusted, to cause the switch contacts to snap closed. Thus by adjusting the degree of such lost motion, as well as by adjusting the degree of opening of the needle valve, the time interval between energization of the coil and closure of the contacts may be varied. In some instances the lost motion means may be omitted or adjusted to have zero lost motion, and reliance placed wholly upon the dashpot to secure the desired time interval. In other instances the time interval may be secured by the combined adjustments of the lost motion means and dashpot. The timer is adjusted to cause the contacts 239 to close upon elapse of a suitable interval after the shielding gas solenoid valve 205 is opened by energization of its coil, such interval corresponding to the time it takes the shielding gas to purge the region of the weld to be made, this interval, as hereinbefore explained, commonly being a fraction of a second.

When the contacts 239 of the timer 235 are closed in the way above described the motor 253, which rotates the block 19 carrying the electrode 43, is energized by reason of such closure connecting one terminal of the motor to the side 153 of the single phase power line by way of the lead 255, lead 257, lead 259, these closed contacts, lead 261, lead 225, and lead 195, the other terminal of the motor being connected to the other side 151 of that power line by the lead 262. As indicated, the motor is series wound and comprises a rheostat, indicated at 263, for adjusting the effective strength of its field for adjusting its speed.

Closure of the contacts 239 of the timer 235 also energizes a high frequency oscillator 265 having the input terminals 267 and 269, the terminal 267 being connected by the lead 271 to the lead 257, which latter, as just explained, is connected by closure of the contacts 239 to the side 153 of the single phase power line, while the terminal 269 is connected to the other side 151 of this power line by the lead 273, lead 275, normally closed switch contacts 277, and lead 279, the oscillator in this way being connected in parallel to the motor 253 so as to be energized simultaneously therewith when the timer closes the contacts 239.

Also connected across the side 151 of the single phase power line and the lead 257, which latter is placed in communication with the other side of said power line by closure of the contacts 239, is the actuating coil 281 of a switch having the three normally open contact pairs 283, such coil in this way being connected in parallel with the motor 253 and input of the oscillator 265 so that when the motor and oscillator are energized said contacts will close simultaneously with such energization. Closure of these contacts is effective to connect the leads 157, 159 and 161 of the three phase power line to the leads 285, 287 and 289, respectively. The three last mentioned leads are connected to the primary winding sections 291 of a delta wound transformer 293 for energizing the latter. The sections 295 of the secondary winding of the transformer are connected by the three leads 297 to the input terminals of a current rectifier 299 having the positive output terminal 301 and negative output terminal 303. The negative output terminal is connected by a lead 304 to the tube sheet 143 in any convenient way, such as by use of a clamp on the end of the lead 304 adjacent the tube sheet, the tube sheet being grounded as indicated at 305. The positive output terminal is connected by a lead 306 to one terminal of a coil 307, the other terminal of which coil is connected by a lead 309 to one terminal of the secondary winding 311 of a transformer 313. The other terminal of this secondary winding is schematically indicated at 315, which terminal projects through a wall portion 317 of the transformer casing, in insulated and in fluid tight relation to said wall, into the T-fitting 215. The end of the flexible conductor 131 for supplying the electrode 43 with welding current is brazed to the terminal 315 and, as hereinbefore described, extends through the flexible water hose 133 to the electrode holder.

The opposite terminals of the primary winding 318 of the transformer 313 are connected by the leads 319 and 321 to the output terminals 323 and 325, respectively, of the high frequency oscillator 265, so that simultaneously with the current rectifier 299 being energized by reason of closure of the contacts 283, as hereinbefore described, a high frequency high tension oscillating current will be impressed upon the primary winding of the transformer, and hence upon the secondary winding 311 of that transformer to initiate the arc struck between the electrode and the metal of the joint between the tube and tube sheet, a circuit for the high frequency current being established, when the arc is struck, through the current rectifier 299 and secondary winding of the transformer 293.

As soon as the arc is struck by the high frequency oscillating current a circuit for the welding current from the rectifier 299 will be established through the arc, and such current flowing through the coil 307, as hereinbefore explained, will cause such coil to open the contacts 277 and thus deenergize the oscillator. If it is desired, and it may be under certain conditions, to have the oscillator operate continuously during the welding cycle, a manually operated switch 327 may be closed to establish a shunt circuit about the contacts 277 by way of the lead 329, which connects one terminal of the switch to the lead 279, and the lead 273 which is connected to the other terminal of the switch.

As hereinbefore pointed out, the welding current is caused to decay just before interrupting that current. In the instant embodiment of the invention for effecting such decay the transformer 293, as schematically shown, is provided with a vertically movable iron core 331 which normally during the welding operation is in its raised position shown by FIG. 10. Electrically the core when lowered is positioned between the primary and secondary windings of the transformer, and when so positioned it acts to reduce the voltage across the transformer secondary winding by forming a partial shunt path for the field of the primary winding so that the portion of such field cutting the turns of the secondary winding is decreased, with the result that when the core is lowered the voltage which the secondary winding impresses upon the current rectifier 299 is decreased to cause a decrease in the welding current. As schematically shown, the core 331 is raised and lowered by a piston 333 contained in a vertical hydraulic cylinder 335, a piston rod 337 being rigidly connected by a member 339 to a vertically extending rod 341 which fixedly carries the core. The upper end of the rod 341 cooperates with a limit switch having the contacts 343 to open those contacts when the rod is in its upper position shown by FIG. 10, and to permit said contacts automatically to close when the rod descends. The lower end of the rod cooperates with the limit switch having the contacts 183 to open said contacts when the rod is lowered by the piston 333 moving downward to the lower end of its stroke, said contacts automatically closing when the rod is moved upward by the piston.

The lower end of the cylinder 335 is connected by a pipe 345 to the outlet of a rotary impeller pump 347 for hydraulic fluid, which pump is driven by an electric motor 349, a check valve 351 being positioned in said pipe to permit flow of the hydraulic fluid toward the cylinder and prevent its flow in the opposite direction. Connected to the pipe 345 between the check valve and the opening of that pipe into the cylinder is a pipe 353 leading to a receptacle 355, and leading from the receptacle is the suction pipe 357 of the pump. In the pipe 353 is positioned a normally closed solenoid valve 359. When the valve is closed, and the pump is operated to lift the piston 333 to its upper position shown in FIG. 10, the check valve 351 will cause the hydraulic fluid to be trapped in the cylinder to maintain the piston in that position upon the pump ceasing to operate. When the solenoid valve 359 is opened by energization of its solenoid 361, and the pump is not operating, the pressure in the cylinder will be relieved to permit the piston to descend and lower the core 331 into the transformer.

If the core 331 is in its lower position, so as to open the contacts 183, the circuit through the coil 179 will not be established by closure of the trigger operated switch 169. However, with the core in such position the contacts 343 will be in closed position, and hence closure of the safety switch 175 will energize the motor 349 by reason of one terminal of the motor being connected to the side 153 of the single phase power line by the lead 363, then closed contacts 343, lead 365, then closed contacts 193, lead 366, lead 225, and lead 195, and by reason of the other terminal of the motor being connected to the other side 151 of said power line by a lead 367. The valve 359 then being closed energization of the motor in this way will drive the impeller pump 347 to cause the latter to force hydraulic fluid into the cylinder 335 and cause the piston to ascend and raise the rod 341 to its position shown by FIG. 10 to permit the contacts 183 to close and to open the contacts 343, opening of the contacts 343 breaking the circuit energizing the motor, the check valve 351 causing the rod to be held in its upper position when the motor ceases operation, after which the trigger 9 may be depressed to close the switch 169 and cause initiation of the welding cycle.

When closure of the contacts 239 of the timer 235 energizes the motor 253, high frequency oscilaltor 265, and coil 281, to initiate the welding, they simultaneously cause energization of the coil 369 of a second timer 371 by reason of one terminal of that coil being connected to the lead 259 which, as hereinbelow explained, is connected by operation of the timer 235 to the side 153 of the single phase power line and by reason of its other terminal being connected by the lead 373 to the other side 151 of that power line. The timer 371 is identical with the timer 235 hereinbefore described, and operates in the same way, except that the timer 371 is adjusted to cause its dashpot piston to ascend much more slowly than the piston 243 of the first mentioned timer and thus cause the period elapsing between energization of the coil 369 and closure of the contacts 379 effected by such energization to be longer than the corresponding period in respect to the first mentioned timer. This period in respect to the timer 371 corresponds to the time which is to elapse from the initiation of the establishment of the arc and commencement of decay in the welding current prior to its interruption. When the contacts 379 are closed the solenoid 361 of the solenoid valve 359 is energized to open that valve by reason of one terminal of such solenoid being connected to one side 153 of the single phase power line by a lead 381, these closed contacts, lead 225, and lead 195, and by reason of its other terminal being connected to the other side 151 of said power line by a lead 383. When energization of the solenoid 361 opens the valve 359 relief of the hydraulic pressure fluid from the cylinder 335 will occur to permit the core 331 to descend by gravity and magnetic forces acting upon it, and such descent will cause the hereinbefore mentioned current decay to occur. When the piston moves to the end of its downward stroke the lower end of the rod 341 will open the contacts 183 and thus deenergize the coil 179 to open the contacts 189 and 191. Opening of the contacts 189 will break the hereinbefore described holding circuit about the switch 169. Opening of the contacts 191 will deenergize the solenoid coils 199 and 201 to permit the valves 203 and 205 to close so as to interrupt the supply of gas and water to the gun. Also opening of the contacts 191 will deenergize the coil 233 of the timer 235 to permit the contacts 239 of the timer to open. Opening of the contacts 239 will deenergize the motor 253 to cause cessation of rotation of the electrode, and will also cause deenergization of the coil 281 to permit the contacts 283 to open to cause interruption of the welding current, and still further will deenergize the high frequency oscillator 265 if the switch 327 is in closed position. At the same time opening of the contacts 239 will cause deenergization of the coil 369 of the timer 371 to cause the contacts 379 of the timer to open, and such opening of the contacts 379 will break the circuit through the solenoid 361 of the solenoid valve 359 to cause that valve to close. When the solenoid valve 359 closes the contacts 183 will be open and the contacts 343 closed and, the safety switch 175 still remaining closed, the impeller pump 347 will be operated by energization of the motor 349 in the way hereinbefore described to cause the piston 333 to be raised to the upper end of its stroke, where it will be maintained by this closed valve and the check valve 351 with the parts in the position shown by FIG. 10 when the ascent of the piston causes the rod 341 to open the contacts 343 to deenergize the motor.

The cycle of operations is now complete, and the mandrel of the gun may then be removed from the welded tube and inserted in the next tube to be welded, and the cycle repeated by depressing the trigger 9.

It will be understood that within the scope of the appended claims wide deviations may be made from the form of the invention herein described without departing from the spirit of the invention.

I claim:

1. A welding gun, for arc welding a tube to a tube sheet or the like having an opening to which the end portion of the tube is presented, comprising a support, a body mounted on said support for axial rotation, an electrode holder carried by said body, an electrode carried by said holder, the gun also comprising means for so positioning it with relation to the tube sheet and tube that the axis of rotation of said body is in registry with the axial line of the tube and the tip of the electrode is positioned in welding relation to the joint between the tube and tube sheet so that upon rotation of said body said tip will travel circumferentially about the joint while so presented, the electrode being in the form of a rod and the electrode holder comprising a sleeve through which said rod extends, a second sleeve carrying the first mentioned sleeve and through which said first mentioned sleeve extends with the axis of said rod in eccentric relation to the axis of said second sleeve, and means rotatably mounting said second sleeve on said body for angular adjustment relative thereto for laterally adjusting the rod radially of said body.

2. A welding gun, for welding tubes to tube sheets and the like having openings to which the end portions of the tubes are presented, comprising an operatively stationary support, a body mounted on said support for axial rotation relative thereto, an electrode carried by said body for rotation therewith of the electrode tip circumferentially about the joint between the tube and tube sheet for welding said joint, a mandrel positioned forwardly of said body in axial alignment with the axis of rotation of the electrode for insertion in the bore of the tube for registering said axis with the axial line of the tube, and means for operatively fixedly securing the rearward end portion of said mandrel to said body for rotation of said body, said means and said mandrel as a unit, said means being so formed and positioned as operatively to lie out of the path of the arc projected from the electrode tip against the joint to be welded.

3. A welding gun according to claim 2 in which the support operatively carries means adapted to rest against that side of the tube sheet from which the mandrel is adapted to be inserted into the tube, for placing in a direction lengthwise of the tube the tip of the electrode in welding relation to the joint to be welded.

4. A welding gun according to claim 2 in which the support is sleeve-like and has the electrode carrying body rotatably mounted within its bore rearwardly of its forward end, which forward end presents an edge adapted to rest against that side of the tube sheet from which the mandrel is adapted to be inserted into the tube for placing in a direction lengthwise of the tube the tip of the electrode in welding relation to the joint to be welded.

5. A welding gun according to claim 2 in which the mandrel has anti-friction means adapted to contact that portion of the wall of the bore of the tube in which the mandrel is inserted.

6. A welding gun according to claim 2 in which the mandrel rotatably carries one or more exterior sleeves adapted to contact that portion of the wall of the bore of the tube in which the mandrel is inserted.

7. A welding gun according to claim 2 in which the electrode is in the form of a straight rod positioned in parallel eccentric relation to the axis of rotation of the rotary electrode carrying body with the electrode tip positioned forwardly of said body and with the axial line of the electrode positioned at one side of the mandrel.

8. A welding gun, for welding tubes to tube sheets and the like having openings to which the end portions of the tubes are presented, comprising an operatively stationary support, a body mounted on said support for axial rotation relative thereto, an electrode carried by said body for rotation therewith of the electrode tip circumferentially about the joint between the tube and tube sheet for welding said joint, a mandrel carried by said body for rotation therewith in axial alignment with the axis of rotation of said electrode, which mandrel projects forwardly of said body for adapting it to be rotatably received within the bore of the tube for registering the axis of rotation of said electrode with the axial line of the tube, means for supplying said gun with welding current and cooling water comprising an electric cable and a water conducting hose, and means operatively carried by said body for rotation coaxially of the axis of rotation of said body for attaching said cable and hose to said body whereby the latter may rotate without twisting said cable and hose.

9. A welding gun, for welding tubes to tube sheets and the like having openings to which the end portions of the tubes are presented, comprising an operatively stationary support, a body mounted on said support for axial rotation relative thereto, an electrode carried by said body for rotation therewith of the electrode tip circumferentially about the joint between the tube and tube sheet for welding said joint, the electrode being in the form of a rod positioned in parallel eccentric relation to the axis of rotation of the rotary electrode carrying body with the electrode tip positioned forwardly of said body, a mandrel for insertion in the bore of the tube for registering the axis of rotation of said electrode with the axial line of the tube, means rotatable with said body and mandrel and operatively positioned and formed to lie out of the path of extent of the electrode and arc adapted to be struck by the latter for fixedly securing the rearward end portion of said mandrel to said body for causing said mandrel to rotate with said body, an electrode holder rotatably carried by said body and having a portion projecting from the rearward end of said body, and means for supplying the gun with welding current and cooling water comprising an electric cable and a water conducting hose connected to such projecting portion of said holder whereby said body may rotate without twisting said cable and hose.

10. A hand held portable welding gun, for welding tubes to tube sheets and the like having openings to which the end portions of the tubes are presented, comprising an axially rotatable body, an electrode carried by said body for rotation of the electrode tip circumferentially about the joint between the tube and tube sheet to be welded, a mandrel carried by said body for rotation therewith in axial alignment with the axis of rotation of said body, which mandrel projects forwardly of said body for adapting it to be rotatably received within the bore of the tube for registering the axis of rotation of said electrode with the axial line of the tube, a support for said rotatable body operatively carrying means adapted to rest against the side of the tube sheet from which said mandrel is adapted to be inserted in the tube for placing the electrode tip in a direction lengthwise of the tube in welding relation to said joint, and a handle operatively carried by said support for manipulation of the gun and for positioning and maintaining the gun in operative relation to the tube sheet and tube.

11. A welding gun according to claim 10 in which the mandrel has anti-friction means adapted to contact that portion of the wall of the bore of the tube in which the mandrel is inserted.

12. A welding gun according to claim 10 in which the mandrel rotatably carries one or more exterior sleeves adapted to contact that portion of the wall of the bore of the tube in which the mandrel is inserted.

13. A welding gun according to claim 10 in which the support is sleeve-like and has the electrode carrying body rotatably mounted within its bore rearwardly of its forward end, which forward end presents an edge adapted to rest against that side of the tube sheet from which the mandrel is adapted to be inserted into the tube for placing in a direction lengthwise of the tube the tip of the electrode in welding relation to the joint to be welded.

14. A welding gun according to claim 10 in which the electrode is in the form of a rod positioned in parallel eccentric relation to the axis of rotation of the rotary electrode carrying body with the electrode tip positioned forwardly of said body, and means rotatable with said body and mandrel and operatively positioned and formed to lie out of the path of extent of the electrode and arc adapted to be struck by the latter for fixedly securing the rearward end portion of said mandrel to said body.

15. A welding gun according to claim 10 having means for supplying it with welding current and cooling water comprising an electric cable and a water conducting hose, and means operatively carried by said body for rotation coaxially of the axis of rotation of said body for attaching said cable and hose to said body whereby the latter may rotate without twisting said cable and hose.

16. A welding gun according to claim 10 in which the electrode is in the form of a rod positioned in parallel eccentric relation to the axis of rotation of the rotary electrode carrying body with the electrode tip positioned forwardly of said body, means rotatable with said body and mandrel and operatively positioned and formed to lie out of the path of extent of the electrode and arc adapted to be struck by the latter for fixedly securing the rearward end portion of said mandrel to said body, an electrode holder rotatably carried by said body and having a portion projecting from the rearward end of said body, and means for supplying the gun with welding current and cooling water comprising an electric cable and a water conducting hose connected to such projecting portion of said holder whereby said body may rotate without twisting said cable and hose.

17. A hand portable welding gun, for welding tubes to tube sheets and the like having openings to which the end portions of the tubes are presented, comprising a support carrying a handle for presenting the gun to the joint to be welded, a body carried by said support for axial rotation relative thereto, an electrode carried by said body in eccentric relation to the axis of rotation of said body whereby to be rotated about said axis in a circular orbit when said body is axially rotated, means operatively carried by said body for rotation therewith adapted to be rotatably received in the bore of the tube for registering the axis of rotation of said body with the axial line of the tube, the gun also comprising means adapted to contact the side of the tube sheet at which the electrode is positioned for positioning the electrode tip in spaced relation to the joint when by use of said handle the gun is presented to the tube and the first mentioned means is pushed into its bore.

18. A welding gun according to claim 18 in which the means adapted to be received in the bore of the tube is provided with anti-friction means adapted to bear against the wall of such bore.

19. A welding gun according to claim 18 in which means is provided for adjustably varying the radius of the circular orbit of rotation of the electrode tip.

20. A welding gun according to claim 18 in which the means for contacting the side of the tube sheet for spacing the electrode tip from the joint is carried by the support for the rotatable body.

21. A hand portable welding gun, for welding tubes to tube sheets and the like having openings to which the end portions of the tubes are presented, comprising a support carrying a handle for presenting the gun to the joint to be welded, a body carried by said support for axial rotation relative thereto, an electrode carried by said body in eccentric relation to the axis of rotation of said body whereby to be rotated about said axis in a circular orbit when said body is axially rotated, the gun also comprising means adapted to be received in the bore of the tube for registering said axis with the axial line of the tube, the gun further comprising a wall positioned to surround said orbit, the electrode tip and the arc adapted to be struck from the latter to form a shield between the arc and the space surrounding the gun at the side of the tube sheet where the gun is positioned when welding the joint.

22. A hand portable welding gun, for welding tubes to tube sheets and the like having openings to which the end portions of the tubes are presented, comprising a support carrying a handle for presenting the gun to the joint to be welded, a body carried by said support for axial rotation relative thereto, an electrode carried by said body in eccentric relation to the axis of rotation of said body whereby to be rotated about said axis in a circular orbit when said body is axially rotated, the gun also comprising means adapted to be received in the bore of the tube for registering said axis with the axial line of the tube, the gun further comprising a wall positioned to surround said orbit, the electrode tip and the arc adapted to be struck from the latter to form a shield between the arc and the space surrounding the gun at the side of the tube sheet where the gun is positioned when welding the joint, said wall being operatively fixedly carried by said support and having a forward edge adapted to contact said side of the tube sheet for spacing the electrode tip from the joint being welded when the gun by use of said handle is presented to the tube and said means is pushed into its bore.

23. In a welding device, a frame adapted to be removably positioned adjacent the work, an electrode driver rotatably supported in said frame, a mandrel projecting axially from said electrode driver for rotation therewith, a piloting cylinder carried by an outer end portion of said mandrel in a position to be removably inserted in a tube whose end is to be welded, said mandrel being rotatable within said cylinder to pilot the tool with respect to the work, an electrode, means in said electrode driver for adjustably holding the electrode in a selected position to engage the end portion of a tube when the piloting cylinder is in position in said tube, and means for causing rotation of said electrode driver.

24. In a welding device, a frame adapted to be removably positioned adjacent the work, a cylindrical electrode driver rotatably supported in said frame, said driver having a bore which is eccentric with respect to its axis of rotation, a cylindrical electrode holder within said bore, said holder having an eccentric longitudinal bore for removably receiving an electrode, and means for securing the electrode holder in a selected position of rotatable adjustment within the bore of the electrode driver to hold the electrode a predetermined distance radially outwardly from the axis of rotation of the electrode driver.

25. In a welding device, a frame adapted to be removably positioned adjacent the work, a cylindrical electrode driver rotatably supported in said frame, said driver having a bore which is eccentric with respect to its axis of rotation and having a gas inlet, a cylindrical electrode holder within said bore having an outer end and having a duct which extends longitudinally of the electrode holder for conducting gas from said driver bore to the exterior, said holder having an eccentric longitudinal bore for removably receiving an electrode, and means for securing the electrode holder in a selected position of rotatable adjustment within the bore of the electrode driver to hold the electrode a predetermined distance radially outwardly from the axis of rotation of the electrode driver.

References Cited in the file of this patent

UNITED STATES PATENTS

| | | |
|---|---|---|
| 1,128,116 | Dralle | Feb. 9, 1915 |
| 1,949,251 | Gilbert | Feb. 27, 1934 |
| 2,151,378 | Elsey et al. | Mar. 21, 1939 |
| 2,510,207 | Behnke et al. | June 6, 1950 |
| 2,717,948 | Cockrell et al. | Sept. 13, 1955 |

UNITED STATES PATENT OFFICE
CERTIFICATE OF CORRECTION

Patent No. 3,125,669                         March 17, 1964

Lowell H. Hawthorne

It is hereby certified that error appears in the above numbered patent requiring correction and that the said Letters Patent should read as corrected below.

Column 1, line 42, for "a" read -- as --; column 2, line 11, for "ond" read -- and --; column 4, line 42, for "159" read -- 149 --; column 9, line 35, for "oscilaltor" read -- oscillator --; column 13, lines 7, 11 and 14, for the claim reference numeral "18", each occurrence, read -- 17 --.

Signed and sealed this 14th day of July 1964.

(SEAL)

Attest:

ESTON G. JOHNSON
Attesting Officer

EDWARD J. BRENNER
Commissioner of Patents